US009098856B2

(12) United States Patent
Sinn et al.

(10) Patent No.: US 9,098,856 B2
(45) Date of Patent: Aug. 4, 2015

(54) PLATFORM FOR DELIVERY OF HEAVY CONTENT TO A USER

(75) Inventors: Richard Sinn, Milpitas, CA (US); Takchun Tse, Sunnyvale, CA (US)

(73) Assignee: YAHOO! INC., Sunnyvale, CA (US)

( * ) Notice: Subject to any disclaimer, the term of this patent is extended or adjusted under 35 U.S.C. 154(b) by 599 days.

(21) Appl. No.: 12/542,160

(22) Filed: Aug. 17, 2009

(65) Prior Publication Data

US 2011/0041076 A1 Feb. 17, 2011

(51) Int. Cl.
*G06F 3/0481* (2013.01)
*G06Q 30/02* (2012.01)

(52) U.S. Cl.
CPC ..................................... *G06Q 30/02* (2013.01)

(58) Field of Classification Search
USPC .......................................................... 715/745
See application file for complete search history.

(56) References Cited

U.S. PATENT DOCUMENTS

| 7,035,907 | B1 * | 4/2006 | Decasper et al. | 709/212 |
|---|---|---|---|---|
| 7,366,996 | B2 * | 4/2008 | Hoyle | 715/854 |
| 7,752,074 | B2 * | 7/2010 | Bosarge et al. | 705/14.54 |
| 8,752,086 | B2 * | 6/2014 | Conant | 725/34 |
| 2002/0059399 | A1 * | 5/2002 | Learmonth | 709/219 |
| 2003/0023745 | A1 * | 1/2003 | Noe | 709/235 |
| 2003/0028565 | A1 * | 2/2003 | Landsman et al. | 707/513 |
| 2004/0068536 | A1 * | 4/2004 | Demers et al. | 709/201 |
| 2005/0071451 | A1 * | 3/2005 | Key et al. | 709/223 |
| 2006/0265283 | A1 * | 11/2006 | Gorodyansky | 705/14 |
| 2007/0094279 | A1 * | 4/2007 | Mittal et al. | 707/100 |
| 2007/0162953 | A1 * | 7/2007 | Bolliger et al. | 725/142 |
| 2007/0204011 | A1 * | 8/2007 | Shaver et al. | 709/219 |
| 2007/0204057 | A1 * | 8/2007 | Shaver et al. | 709/231 |
| 2007/0271366 | A1 * | 11/2007 | Demers et al. | 709/223 |
| 2008/0033798 | A1 * | 2/2008 | Carey et al. | 705/14 |
| 2008/0040436 | A1 * | 2/2008 | Setlur et al. | 709/206 |
| 2008/0195457 | A1 * | 8/2008 | Sherman et al. | 705/10 |
| 2008/0270242 | A1 * | 10/2008 | Aaltonen | 705/14 |
| 2008/0306909 | A1 * | 12/2008 | Bernard et al. | 707/3 |
| 2009/0006213 | A1 * | 1/2009 | Lerman et al. | 705/14 |
| 2009/0006214 | A1 * | 1/2009 | Lerman et al. | 705/14 |

(Continued)

OTHER PUBLICATIONS

Ajax (programming)—Wikipedia, http://en.wikipedia.org/w/index. php?title=Ajax_(programming)&printable, accessed Aug. 12, 2009, 4 pgs.

(Continued)

*Primary Examiner* — William Bashore
*Assistant Examiner* — Hien Duong
(74) *Attorney, Agent, or Firm* — James J. DeCarlo; Greenberg Traurig, LLP

(57) ABSTRACT

Heavy content is selectively provided over a network to a client device using a background mode based on a user's tracked behavior and other profile information, such that the heavy content may be served up within a web page, messenger application, and/or other application when the user of the client device performs a particular action, such as requesting a web page configured to display the heavy content. Based on the user's profile, heavy content is downloaded onto the user's client device automatically without the user performing additional actions and before the user accesses a web page that may enable access to the heavy content. When the user requests a web page, the web page is parsed to determine whether it is configured for use with heavy content. If so, then the downloaded heavy content is served to the user based on the requested web page and user identifier.

19 Claims, 6 Drawing Sheets

(56) References Cited

U.S. PATENT DOCUMENTS

| | | |
|---|---|---|
| 2009/0030774 A1* | 1/2009 | Rothschild et al. ............. 705/10 |
| 2009/0094638 A1* | 4/2009 | Brier et al. ...................... 725/34 |
| 2009/0132559 A1* | 5/2009 | Chamberlain et al. ........ 707/100 |
| 2009/0135177 A1* | 5/2009 | Strietzel et al. ............... 345/419 |
| 2009/0198580 A1* | 8/2009 | Broberg et al. ................. 705/14 |
| 2009/0319516 A1* | 12/2009 | Igelman et al. ................... 707/5 |
| 2009/0327054 A1* | 12/2009 | Yao et al. ........................ 705/12 |
| 2010/0042424 A1* | 2/2010 | Turakhia ........................... 705/1 |
| 2010/0042618 A1* | 2/2010 | Rinearson et al. ................ 707/5 |
| 2010/0064040 A1* | 3/2010 | Wise et al. .................... 709/224 |
| 2010/0076818 A1* | 3/2010 | Peterson et al. ................ 705/10 |
| 2010/0082354 A1* | 4/2010 | Sundaresan ....................... 705/1 |
| 2010/0228582 A1* | 9/2010 | King et al. ......................... 705/7 |
| 2010/0268720 A1* | 10/2010 | Spivack et al. ................ 707/756 |
| 2010/0269044 A1* | 10/2010 | Ivanyi et al. ................... 715/736 |
| 2011/0041076 A1* | 2/2011 | Sinn et al. ...................... 715/745 |
| 2013/0066822 A1* | 3/2013 | Kast et al. ....................... 706/47 |

OTHER PUBLICATIONS

Ajax framework—Wikipedia, http://en.wikipedia.org/w/index.php?title=Ajax_framework&printable, accessed Aug. 12, 2009, 4 pgs.

Schulzrinne, H., "Real Time Streaming Protocol (RTSP)," RFC 2326, Real Networks, Apr. 1998, 58 pgs.

* cited by examiner

PLATFORM FOR DELIVERY OF HEAVY CONTENT TO A USER

TECHNICAL FIELD

Embodiments relate generally to delivery of content to a client device and, more particularly, but not exclusively to, based on a user's tracked behavior, downloading in a client device's background mode heavy content to the client device absent a link to or request for the content being detected such that the heavy content is available for display within a client application when requested. Moreover, such downloaded content is available to more than one client application.

BACKGROUND

Tremendous changes have been occurring in the Internet that influence our everyday lives. For example, in today's society, one of the first activities that a user might perform during their day is to turn on their computers is to communicate with friends, co-workers, family, as well as to read news and/or a variety of other online content. In fact, today, many of a person's social activities are now being conducted over the Internet.

Thus, many people are looking to the Internet to provide them with richer, fuller content that might include live tutorials, movies, music, and yes, even richer advertisements. Many people today have identified advertisements to not only be entertaining, but educational and informative. However, delivering rich content that may include documents, movies, music files, applications, or the like, that might be large in size has been a slow and sometimes frustrating experience for an Internet user. Large content files, sometimes, called heavy content may include files that are anywhere between about one Megabyte in size to hundreds or even thousands of Megabytes in size. A traditional mechanism for delivering heavy content, such as movies, over the Internet has been to employ a content streaming communications protocol. However, as many people may have experienced, streamlining movies may result in skips, stalls, or other detectable delays in receipt of the content by the user. When a user wishes to fast forward, or even rewind, additional detectable delays may become apparent to the user, further providing increased frustration for the user. Thus, it is with respect to these considerations and others that the present invention has been made.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding, reference will be made to the following Detailed Description, which is to be read in association with the accompanying drawings, wherein.

DETAILED DESCRIPTION

Figure 1:
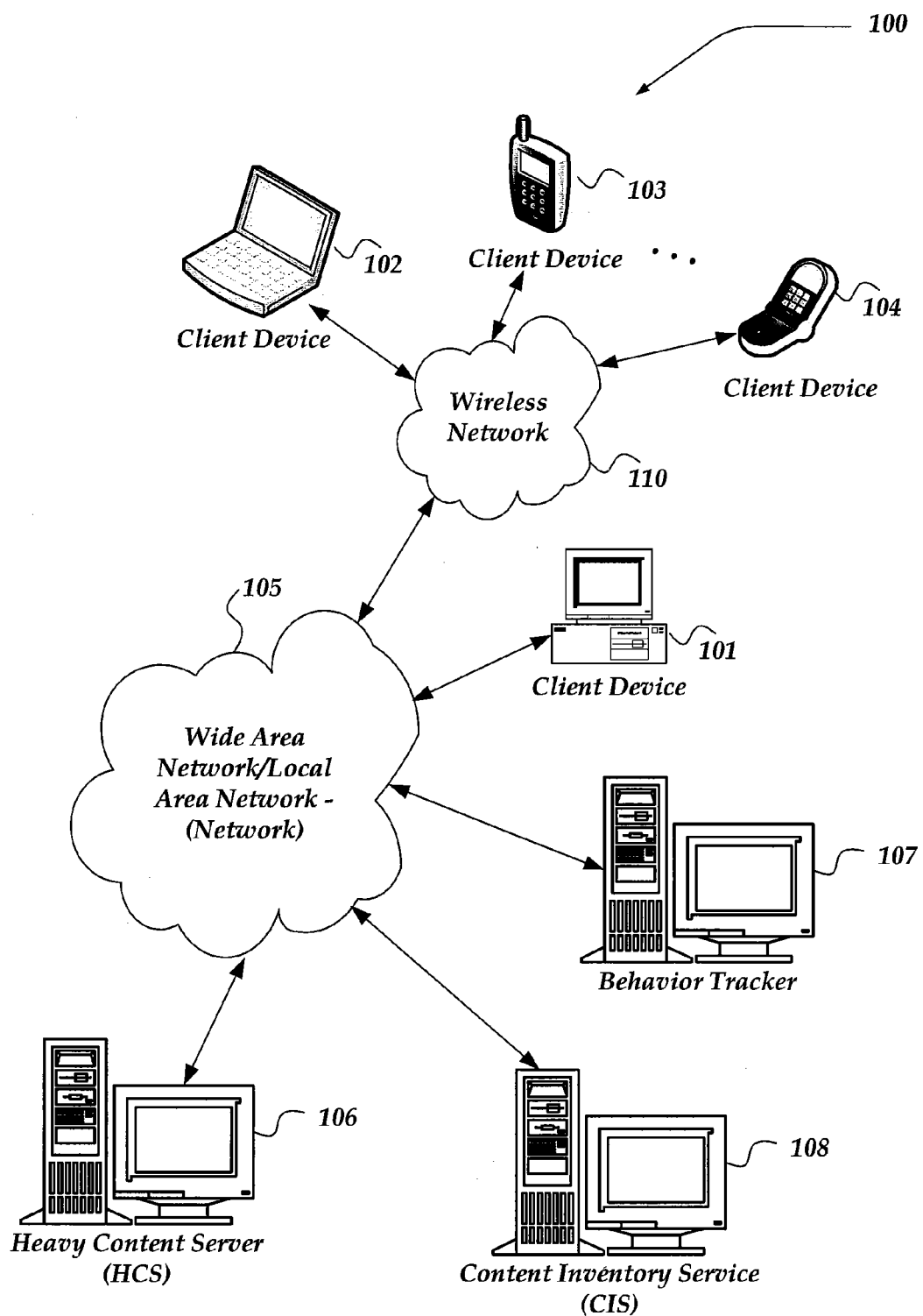
FIG. 1 is a system diagram of one embodiment of an environment in which embodiments of the invention may be practiced.

The present invention now will be described more fully hereinafter with reference to the accompanying drawings, which form a part hereof, and which show, by way of illustration, specific embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "content" refers to any digital data that may be provided over a network for use by a receiving user. Examples of content include but are not limited to motion pictures, movies, videos, music, interactive media, audios, still images, text, graphics, scripts, applications, and other forms of digital data useable by a computing device. However, content is not limited to these examples, and virtually any digital data may be included, without departing from the scope or spirit of the invention. Content is further categorized into "heavy content," or non-heavy content. As used herein, the term "heavy content" refers to any digital data that exceeds about one Megabyte in size. Thus, heavy content may include digital photographs, movies, computer games, applications, and advertisements.

As used here, the term "background mode" refers to actions that are performed within or by a computing device, such as a client device, that are performed using one or more of the computer's resources while another application is executing in a "foreground mode" such that the foreground mode application has priority for the resources over the background mode actions. Thus, an application or other action that is to execute in background mode waits until resources become available to execute. For example, if a foreground application is using memory of the computing device, the foreground mode may use memory that is available after the foreground application has been allocated memory. However, if the foreground application uses the resources such that there are insufficient resources for the background mode application to execute, then the background application waits, until resources are available.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards providing heavy content over a network to a client device using the client's background mode, such that the heavy content may be served up within a web page, messenger application, and/or other application when a user of the client device performs a particular action, such as request a web page configured to display of the heavy content. A user profile is determined based on a variety of network activities by the user, including browsing actions, purchase actions, messaging activities, blogging, or other social networking activities by the user over the network. The invention is not limited to these sources of user information and others are envisaged. In one embodiment, the user may be identified based on a messenger login identifier, an Internet Protocol (IP) address of the user's client device, and/or a variety of other accessible identifiers. Based on the user's profile, heavy content may be downloaded onto the user's client device using an offline download mechanism. Such downloads are typically performed automatically without the user performing an action, such as requesting the content, browsing a web page that includes a link or the like to the heavy content, or other actions. The downloaded content may then be stored on the client device. When the user subsequently performs some action, such as requesting a web page, the web page is examined or parsed to determine whether it is configured for use with heavy content. If so, then downloaded heavy content is selected based on the requested web page and user identifier. The heavy content is then inserted or otherwise provided through the user's browser. In one embodiment, the web page might include a default advertisement, which may be replaced by the heavy content. In another embodiment, different downloaded heavy content might be served to the user through the browser over time, when the user transitions from and then back to the web page, or performs some other browser related action. Where the user employs a messenger or other application, other indicators might be detected for use in serving heavy content to the user, including when a messenger application is displayed, or the like. In one embodiment, where multiple users might employ a same client device, heavy content may be downloaded offline for each user based on their unique user profile data. Thus, different heavy content might be displayed to different users for a same web page, messenger application, or the like. However, in another embodiment, where the users' profiles might include similarities, a same or similar heavy content might be provided to each of the users. In one embodiment, the delivery of heavy content is specific to delivery of heavy advertisements, which are defined as a form of communication used to help sell a product or service, and the advertisement is digitally greater than one Megabyte in size.

As herein described, embodiments of the invention employ mechanisms that are unlike traditional approaches that might receive a web page, analyze the web page for links to other content, and then prior to receiving a request to the other linked content, download the other linked content based on some expectation algorithm, or the like. Thus, traditional approaches must first receive the web page that provides the link to the other content. However, unlike such traditional mechanisms, the present invention does not require such first web page to analyze. Instead, content is provided to the client device independent of any such web page with links to other content. Thus, there is no web page to analyze in the present invention. Moreover, the other traditional approaches, the other linked content remains constrained to being accessed within a web browser. However, unlike the traditional approaches, the downloaded content in the present embodiments may be available to a variety of different applications, including, but not limited to messenger applications, such as an Instant Messenger (IM) application, email application, Short Messaging Service (SMS) application, or the like, as well as toolbars, game applications, video execution applications, photo management applications, or the like. Thus, embodiments of the present invention provide numerous advantages over traditional approaches.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, Heavy Content Server (HCS) 106, Content Inventory Service (CIS) 108, and Behavior Tracker (BT) 107.

One embodiment of a client device usable as one of client devices 101-104 is described in more detail below in conjunction with FIG. 2. Generally, however, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like. Client device 101 may include virtually any computing device that typically connects using a wired communications medium such as personal computers, multiprocessor systems, microprocessor-based or programmable consumer electronics, network PCs, or the like. In one embodiment, one or more of client devices 101-104 may also be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web-based language, including a wireless application protocol messages (WAP), or the like. In one embodiment, the browser application is enabled to employ Handheld Device Markup Language (HDML), Wireless Markup Language (WML), WML-Script, JavaScript, Standard Generalized Markup Language (SMGL), HyperText Markup Language (HTML), eXtensible Markup Language (XML), or the like, to display and send information.

Client devices 101-104 also may include at least one other client application that is configured to, receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), mobile device identifier, network address, or other identifier. The identifier may be provided in a message, or the like, sent to another computing device.

Client devices 101-104 may also be configured to communicate a message, such as through email, SMS, MMS, IM, IRC, mIRC, Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as SDCS 106, or the like. Such user account, for example, may be configured to enable the user to receive emails, send/receive IM messages, SMS messages, access selected web pages, or participates in any of a variety of other social networking activity. However, managing of messages or otherwise participating in other social activities may also be performed without logging into the user account. In one embodiment, a login identifier might be employed with the client application. Such login identifier may also be used to identifier the user for a variety of other activities, including tracking various network activities performed over a network by the user. While the login identifier may be used to track network activities, the other identifiers mentioned above, may also be used. Thus, one or more identifiers associated with the client device and/or the user of the client device may be used to track network activities of the user. In one embodiment, BT 107 described below employs the one or more identifiers to associated monitored network activities with a user.

In one embodiment, the user of client devices 101-104 may also be enabled to access a web page, or other user interface that enables the user to enter, select, and/or otherwise generate one or more content items, and/or to read content items. In one embodiment, the user might again, employ a login identifier, or other type of identifier to access a web page, and/or to provide content to a web page, or the like.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G), 4th (4G) generation radio access for cellular systems, WLAN, Wireless Router (WR) mesh, or the like. Access technologies such as 2G, 2.5G, 3G, 4G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple HCS 106, CIS 108, BT 107, and client device 101 with other computing devices, including through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

BT 107 includes virtually any one or more network devices that are configured to monitor activities over a network of one or more users to generate one or more user behavior profiles. In one embodiment, BT 107 might receive and/or otherwise intercept messages between client devices 101-104. BT 107 may then perform an analysis on the messages to collect various behavior information about the message sender/receiver, including, but not limited to what a subject of the message is about, how often does the sender/receiver send messages on such subject, or the like. BT 107 may analyze the messages to determine, for example, a hot word/phrase/subject list. For example, BT 107 might determine how often a particular word, phrase, or subject has occurred within messages from a particular sender (and/or to a particular recipient). BT 107 is not limited to tracking merely messages however. BT 107 may track which websites a user frequents, types of activities performed while at the websites, whether the user provides content to the websites, makes purchases, a type of purchase made, and the like. In fact, virtually any activity performed by a user over a network might be tracked and recorded. BT 107 may further analysis the various tracked activities to determine whether their might be a pattern of activities by the user.

In one embodiment, BT 107 obtains an identifier for the user, such as a login identifier, and/or a client device identifier, or the like. BT 107 may then store various information, analysis results, patterns, hot word/phrase/subject lists, and the like, for a particular user based on the obtained identifier. In one embodiment, BT 107 might store such information for the user within a user behavior profile.

It should be noted, however, that the invention is not limited to merely BT 107 performing such tracking, and other network devices, websites, messenger services, Internet Service Providers (ISP), or the like, may also track various networking activities for a user and provide at least some of their tracked data to BT 107. For example, in one embodiment, a website, blog, network service, or the like, might be configured, collect information about a reputation of the user for at least their online activities. A reputation might be based on a variety of user activities, as well as based on feedback about the user's activities from other users. Such reputation information might therefore be collected, analyzed, and provided to BT 107 for storage, at least in part, within a user's behavior profile. Thus, a user's behavior profile includes information about the user for which the user typically does not directly provide to BT 107. However, the invention is not so limited, and other information may also be included. For example, in one embodiment, survey results and other direct entries by the user might also be used. For example, the user might provide selected information about the user's age, occupation, likes/dislikes, or the like.

CIS 108 includes one or more network devices configured to receive and to store heavy content, including heavy advertisements, heavy movies, photographs, tutorials, and the like. CIS 108 may receive the heavy content from any of a variety of sources (not shown) including, but not limited to content producers, such as film producers, content aggregators, content distributors, or the like. CIS 108 may also receive advertisements, and the like, from advertisers, product providers, service providers, or the like. CIS 108 may even receive heavy content from other users, from BT 107, ISPs, and/or other product/service providers. In one embodiment, CIS 108 may employ a plurality of database structures to manage the heavy content. However, the invention is not so limited and other storage schemes may also be used, including, for example, folders, links to other sources, scripts, applications, or the like.

HCS 106 includes one or more network devices that are configured to provide heavy content to client devices 101-104 in a client's background mode, such that the heavy content is available for display (and/or for audio play), when an application on the client device that is so configured, indicates that heavy content is to be displayed, as described further below. HCS 106 may receive an identifier from a client device, and use the identifier to locate a user behavior profile from BT 107 that includes tracked behaviors of a user of the client device. HCS 106 may then use the user behavior profile to select one or more heavy content items stored on CIS 108. HCS 106 may then, automatically download the selected (determined) heavy content items to a client device associated with the identifier using a background mode of the client device, without receiving a request from the client device for the heavy content items.

HCS 106 may also download one or more heavy content modules to a client device such that the heavy content modules may be installed onto the client device for use in performing some or more of the above actions of HCS 106, including, for example, requesting a user behavior profile from BT 107, selecting heavy content items from CIS 108, and/or automatically downloading in a client background mode the selected one or more heavy content items. The downloaded heavy client modules may further detect various conditions, events, or the like, for which heavy content is to be displayed or otherwise presented to a user at the client device, as described further below. Thus, in one embodiment, HCS 106 may perform various actions, on behalf of a client device, and/or provide heavy content modules to the client device to enable the client device to perform one or more actions associated with managing heavy content. In still another embodiment, a combination of HCS 106 and the downloaded client modules may perform such heavy content management activities. Hence, HCS 106 and/or the downloaded heavy content modules may employ processes such as described below in conjunction with FIGS. 4-5 to perform at least some of their actions.

Devices that may operate as HCS 106, CIS 108, and/or BT 107 include, but are not limited to personal computers, desktop computers, multiprocessor systems, microprocessor-based or programmable consumer electronics, network PCs, servers, network appliances, and the like.

Although HCS 106 is illustrated as a distinct network device, the invention is not so limited. For example, a plurality of network devices may be configured to perform the operational aspects of HCS 106. For example, in one embodiment, the managing downloading heavy content might be performed by one network device, and managing access to BT 107 and/or CIS 108 might be performed by another network device. However, in another embodiment, functionality of HCS 106, CIS 108, and/or BT 107 might be performed using a single network device. For example, as described below in conjunction with FIG. 3, functions of HCS 106, CIS 108, and/or BT 107 are described within a single network device. However, as noted above, other configurations are also envisaged. Thus, system 100 (and network device 300) should not be construed as limiting the invention, and other system structures may be used.

Illustrative Client Environment

Figure 2:
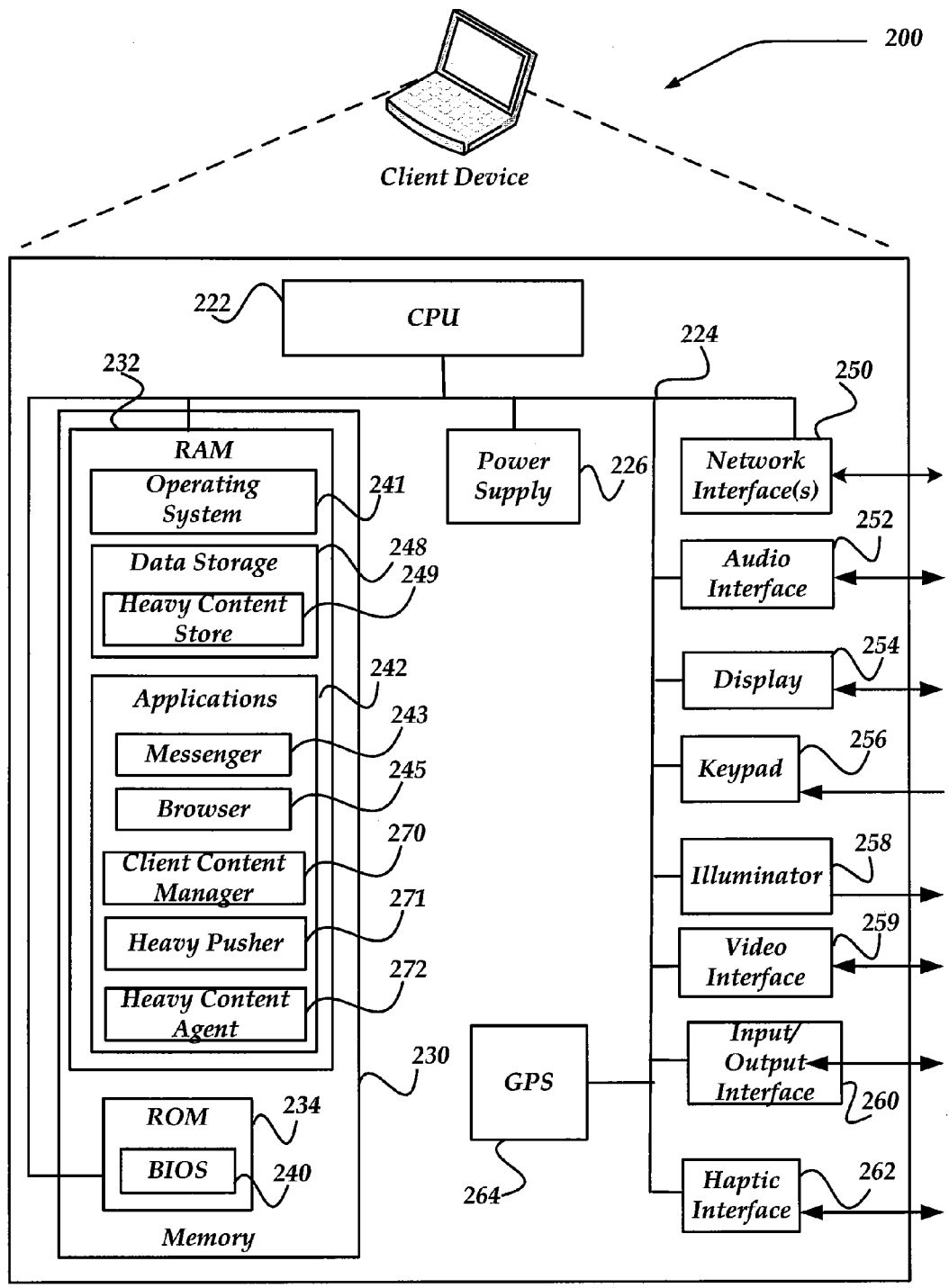
FIG. 2 shows one embodiment of a client device that may be included in a system implementing various embodiments.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, one of client devices 101-104 of FIG. 1.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, r any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. In addition, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of client device 200. The mass memory also stores an operating system 241 for controlling the operation of client device 200. It will be appreciated that this component may include a general-purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 248, which can be utilized by client device 200 to store, among other things, applications 242 and/or other data. For example, data storage 248 may also be employed to store information that describes various capabilities of client device 200, as well as store an identifier. The information, including the identifier, may then be provided to another device based on any of a variety of events, including being sent as part of a header during a communication, sent upon request, or the like. In one embodiment, the identifier and/or other information about client device 200 might be provided automatically to another networked device, independent of a directed action to do so by a user of client device 200. Thus, in one embodiment, the identifier might be provided over the network transparent to the user.

Moreover, data storage 248 may also be employed to store personal information including but not limited to contact lists, personal preferences, data files, graphs, videos, or the like. Data storage 248 may further provide storage for heavy content items. Thus, in one embodiment, data storage 248 may include heavy content store 249 that is arranged to provide a local storage of heavy content items, including heavy advertisements, tutorials, movies, or the like, downloaded to client device 200 in a background mode of operation of client device 200. At least a portion of the stored information may also be stored on a disk drive or other storage medium (not shown) within client device 200.

Applications 242 may include computer executable instructions which, when executed by client device 200 within a processor such as CPU 222, may perform actions, including, transmit, receive, and/or otherwise process messages (e.g., SMS, MMS, IM, email, and/or other messages), multimedia information, and enable telecommunication with another user of another client device, as well as perform other actions associated with one or more applications, operating system components, and the like. Other examples of application programs include calendars, browsers, toolbar applications, email clients, IM applications, SMS applications, VOIP applications, contact managers, task managers, transcoders, database programs, word processing programs, security applications, spreadsheet programs, games, search programs, and so forth. Applications 242 may include, for example, messenger 243, browser 245, client content manager 270, heavy pusher 271, and heavy content agent 272. In one embodiment, client content manager 270, heavy pusher 271, and heavy content agent 272 (and optionally heavy content store 249) may be referred to as heavy content modules that may be downloaded and installed onto client device 200.

Browser 245 may include virtually any client application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), Hyper- Text Markup Language (HTML), extensible Markup Language (XML), and the like, to display and send a message. However, any of a variety of other web-based languages may also be employed.

Messenger 243 may be configured to initiate and manage a messaging session using any of a variety of messaging communications including, but not limited to email, Short Message Service (SMS), Instant Message (IM), Multimedia Message Service (MMS), internet relay chat (IRC), mIRC, and the like. For example, in one embodiment, messenger 243 may be configured as an IM application, such as AOL Instant Messenger, Yahoo! Messenger, .NET Messenger Server, ICQ, or the like. In one embodiment messenger 243 may be configured to include a mail user agent (MUA) such as Elm, Pine, MH, Outlook, Eudora, Mac Mail, Mozilla Thunderbird, gmail, or the like. In another embodiment, messenger 243 may be a client application that is configured to integrate and employ a variety of messaging protocols.

As noted, client content manager 270, heavy pusher 271, and heavy content agent 272 may be downloaded from a remote network device, such as HCS 106 of FIG. 1. However, such heavy content modules may also be accessed and installed using any of a variety of other mechanisms, including, but not limited to a DVD, tape, or the like.

In any event, client content manager 270 is configured to manage delivery of heavy content items for use by one or more client applications, such as messenger 243, toolbar applications, game applications, browser 245, and/or any of a variety of other client applications 242. As such, in one embodiment, client content manager 270 may interact with BT 107 of FIG. 1 to obtain a user behavior profile associated with a current logged in user of a client application 242. In one embodiment, client content manager 270 may further contact CIS 108 to offline download (download in a background mode of operation of client device 200) one or more heavy content items. Client content manager 270 may employ the user behavior profile to select such heavy content items, or provide the user behavior profile to another network device for use in selecting the heavy content items to be downloaded in background mode. Client content manager 270 may store the downloaded content items in heavy content store 249. In one embodiment, the background downloading is configurable using an Application Programming Interface (API), or other user interface, that may be exposed by operating system 241 and/or client content manager 270. In one embodiment, the downloaded heavy content items may be indexed within heavy content store 249 based on a user identifier, or the like. In this manner, heavy content store 249 may manage heavy content items for different users (identifiers).

Heavy pusher 271 and heavy content agent 272 may operate together, in one embodiment, to deliver heavy content items to one or more different applications 242, including browser 245 and/or messenger 243. In one embodiment, heavy pusher 271 represents a component that is configured to retrieve one or more heavy content items from heavy content store 249 and deposit it into a heavy content enabled location for an application, such as messenger 243, or the like. In one embodiment, heavy pusher 271 may employ a local zone within client device 200 for which content may be provided to a variety of applications 242. Such local zones are arranged based on various security levels of client device 200 to enable other applications to communicate relatively unencumbered by such security measures as sandboxes, or the like. In any event, one or more applications 242 may then access and display or otherwise enable a user to access the deposited heavy content item. For example, in one embodiment, messenger 243 might locate the deposited heavy content item and display the content item within a toolbar or banner location, or within a skin location of messenger 243. In one embodiment, messenger 243 might replace a non-heavy content item with the deposited heavy content item. In another embodiment, messenger 243 might display or otherwise provide access to the deposited heavy content item within a message displayed to a user within messenger 243.

Heavy content agent 272 represents one or more components that may be web browser enabled, such as a browser plug-in, or the like, that enables delivery of heavy content items into a web page. In one embodiment, therefore, heavy content agent 272 may be an ActiveX component, a browser extension, an application, script, applet, or the like. For example, in one embodiment, heavy content agent 272 might be a Firefox extension for Firefox and/or Google Chrome browsers.

Thus, in one embodiment, a web page might be arranged to include traditional content slots. Such slots might be identified via links, tags, scripts, or the like. In one embodiment, then, heavy content items might be delivered to a web page having such slots by providing a default content item plus an additional HTML tag, or the like for heavy content. The web page may then be parsed or otherwise analyzed for the tag, link, script, or the like. In one embodiment, the heavy content item tags in a web page might appear as the following:

```
<! - yh_mgr.slots.Middle1 = {content_size_list: ["400x350"],
content_delivery_mode: "heavy", content_format_list: [ ] } -->
<! - yh_mgr.slots.Frame1 = {content_size_list: ["234x234"],
content_delivery_mode: "heavy", content_format_list: [ ] } --> ;
```

It should be noted, however, that the above tag format is to be viewed as one embodiment, of a non-exhaustive, non-limiting example. As such, other tag structures, options, parameters, and the like, may also be used, without departing from the scope of the invention.

In any event, in one embodiment, heavy content agent 272 may intercept the web page, parse the web page to detect the tag, such as illustrated above, and determine that the web page is configured to serve heavy content (e.g., content_delivery_mode: "heavy"). Heavy content agent 272 may then call heavy pusher 271, which may in turn call client content manager 270 to check a target user behavior profile of a web user. Based on the target user behavior profile, heavy pusher 271 may retrieve the heavy content item(s) from heavy content store 249. Heavy content agent 272 may then take the heavy content item(s) and place it into the web page. In one embodiment, heavy content agent 272 may replace a default content item with the heavy content item(s).

Client content manager 270, heavy pusher 271, and/or heavy content agent 272 may employ some or all of processes 500 and 600 described below in conjunction with FIGS. 5-6 to perform at least some of their actions.

Illustrative Network Device Environment

Figure 3:
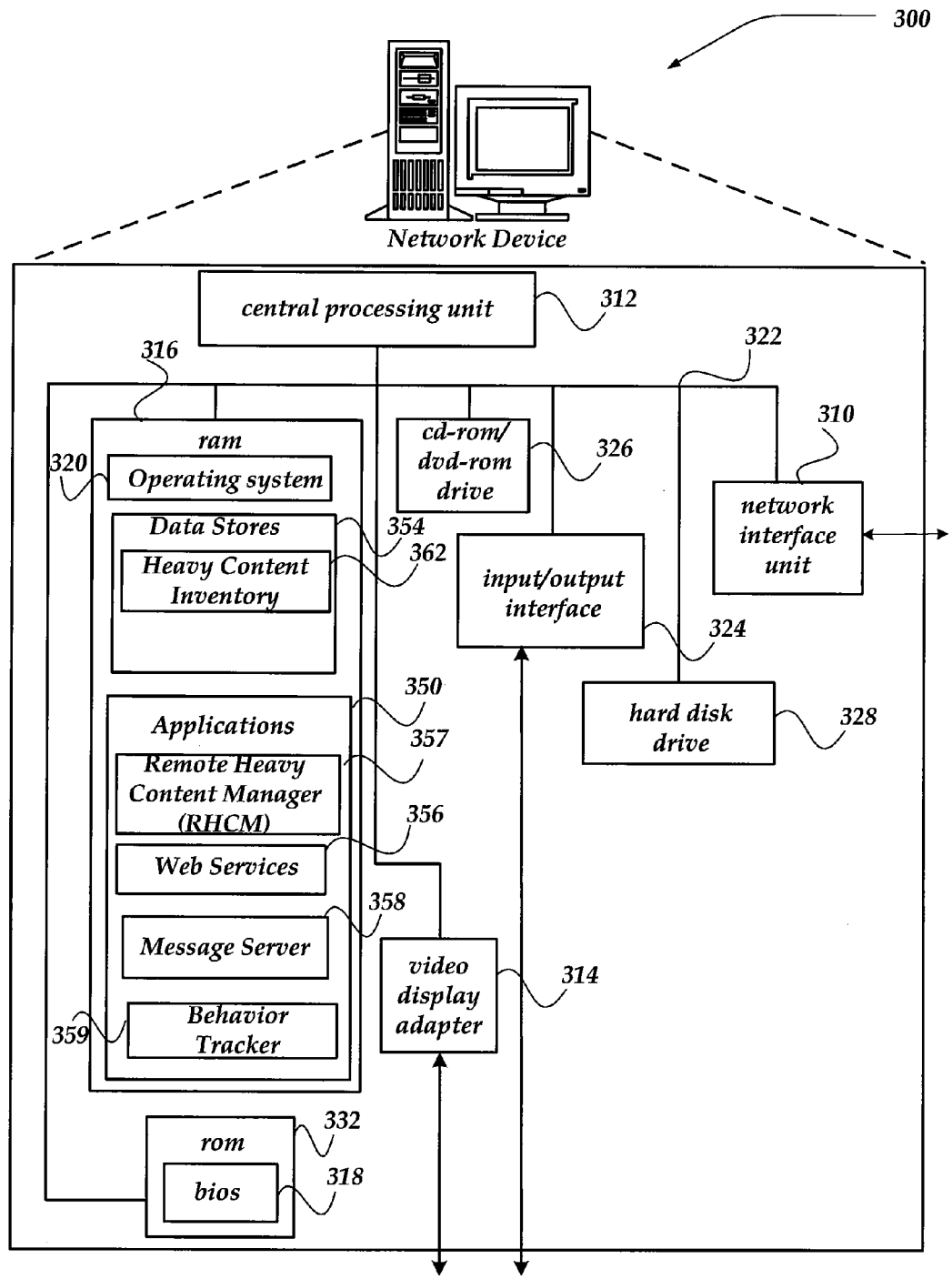
FIG. 3 shows one embodiment of a network device that may be included in a system implementing various embodiments.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, a combination of HCS 106, CS 108, and BT 107 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other physical medium which can be used to store the desired information and which can be accessed by a computing device.

The mass memory also stores program code and data. For example, mass memory might include data stores 354. Data stores 354 may be include virtually any mechanism usable for store and managing data, including but not limited to a file, a folder, a document, or an application, such as a database, spreadsheet, or the like. Data stores 354 may manage information that might include, but is not limited to web pages, account information, or the like, as well as scripts, applications, applets, and the like. Data stores 354 may also include various heavy content modules that may be downloaded and installed on one or more client devices, such as client devices 101-104 of FIG. 1. Further, data stores 354 may include heavy content inventory 362. Heavy content inventory 362 may mange heavy content items for use by one or more client devices and/or one or more user identifiers. In one embodiment, heavy content inventory 362 may be indexed based on a subject, or the like. At some of the data and other information stored within data stores 354 may be stored in part or in whole on other computer readable storage media including, hard disk drive 328, cd-rom/dvd-rom drive 326, or even on another remote network device.

One or more applications 350 may be loaded into mass memory for execution by central processing unit 312 to perform various actions. Such applications 350 may include, but are not limited to HTTP programs, customizable user interface programs, IPSec applications, encryption programs, security programs, VPN programs, web servers, account management, and so forth. Applications 350 may include web services 356, Message Server (MS) 358, Remote Heavy Content Manager (RHCM) 357, and behavior tracker 359.

Web services 356 represent any of a variety of services that are configured to provide content, including messages, over a network to another computing device. Thus, web services 356 include for example, a web server, messaging server, a File Transfer Protocol (FTP) server, a database server, a content server, or the like. Web services 356 may provide the content including messages over the network using any of a variety of formats, including, but not limited to WAP, HDML, WML, SMGL, HTML, XML, cHTML, xHTML, or the like. In at least one web page provided through web services 356, might be a tag, link, or other mechanism, useable to identify that the web page is configured to server heavy content. In one embodiment, the web page might include a default content item that may be subsequently replaced by a heavy content item at the client device. In another embodiment, the web page might merely include a tag, link, or other mechanism where a heavy content item may be inserted, in absence of a default content item.

Message server 358 may include virtually any computing component or components configured and arranged to forward messages from message user agents, and/or other message servers, or to deliver messages to a local message store, such as data stores 354, or the like. Thus, message server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like.

However, message server 358 is not constrained to email messages, and other messaging protocols may be managed by one or more components of message server 358. Thus, message server 358 may also be configured to manage SMS messages, IM, MMS, IRC, mIRC, or any of a variety of other message types.

Behavior tracker 359 represents a component within network device 300 that is configured to monitor activities over a network of one or more users to generate one or more user behavior profiles. As such, behavior tracker 359 might perform substantially similar actions as BT 107 of FIG. 1, including storing one or more user behavior profiles within data stores 354. In one embodiment, behavior tracker 359 might employ a process such as described below in conjunction with FIG. 4 to perform at least some of its actions.

RHCM 356 is configured to manage delivery of client heavy content modules such as described above in conjunction with FIG. 2 to one or more client devices. RHCM 356 may further manage various aspects of delivery of heavy content items to a client device based a user behavior profile. As such, in one embodiment, RHCM 356 might interact with behavior tracker 359 to receive an identifier from a client device, such as a client device identifier, login identifier, or the like. RHCM 356 might then provide the identifier to behavior tracker 359 such that behavior tracker 359 may store tracked user network activities and detected patterns in data stores 354 based on the identifier. RHCM 356 might further perform various analyses of the stored user behavior profiles to select one or more content items from within heavy content inventory 362. RHCM 356 may then operate in conjunction with various client heavy content modules to automatically provide the selected heavy content items to the client device using a background mode of operation of the client device, without receiving a request from the client device for the heavy content items through a web page, messenger application, or the like. In one embodiment, however, a client heavy content module may be configured to, instead of using RHCM 356, select and request downloading the content items using the client device's background mode of operation. Thus, it should be understood that RHCM 356 may select and provide the heavy content items, and/or a downloaded heavy content module may select and/or request downloading of the heavy content items. In either instance, the heavy content items are downloaded absent an analysis being performed of a message, and/or web page to detect a link to, or similar mechanism that requests the heavy content item. As noted above, then, such heavy content items are downloaded independent of any requests identified within a web page, a message, or similar application for the heavy content item.

Generalized Operation

Figure 4:
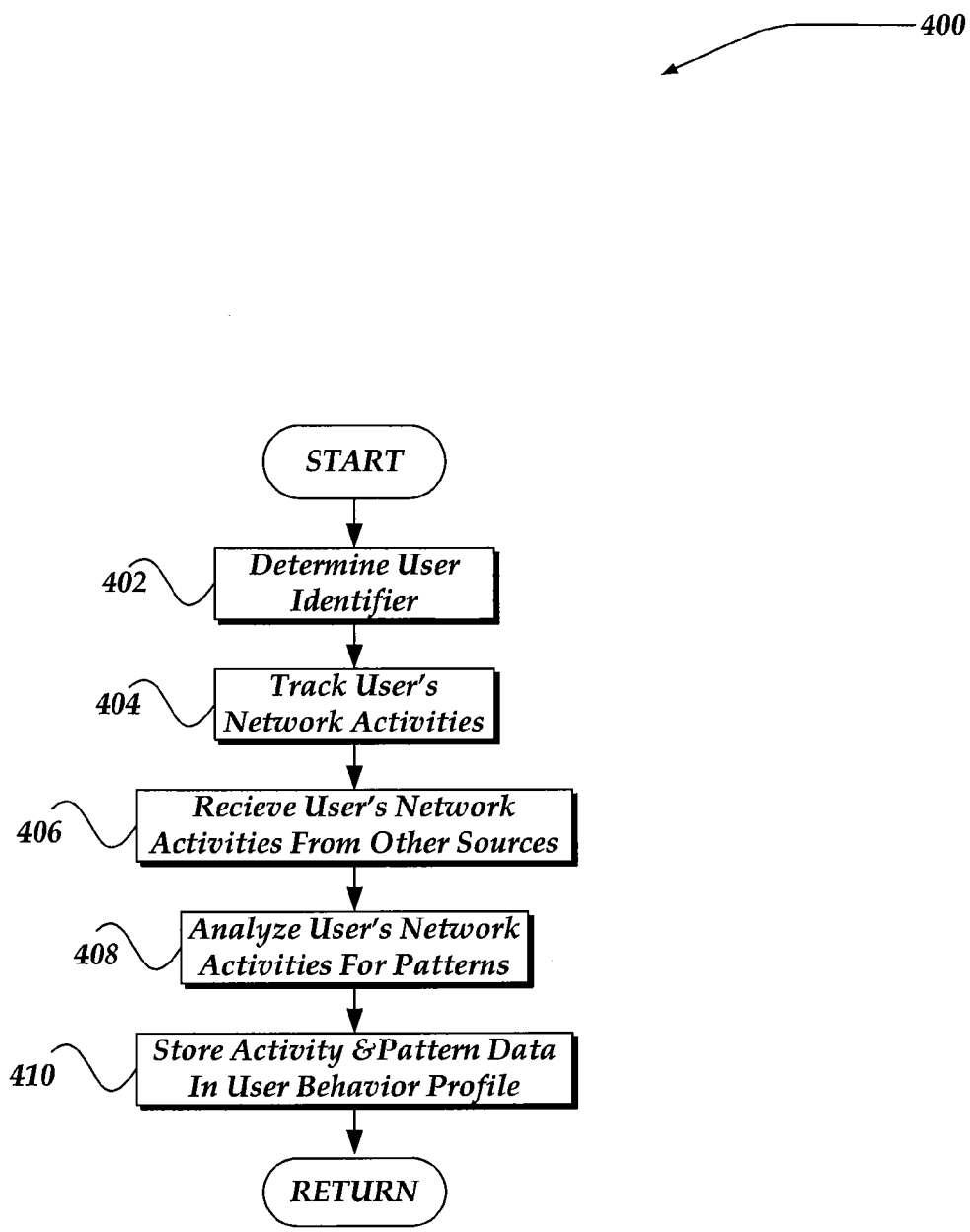
FIG. 4 illustrates a logical flow diagram generally showing one embodiment of a process for managing a user's behavior profile based in part of tracked network activities.

The operation of certain aspects of the invention will now be described with respect to FIGS. 4-6. FIG. 4 illustrates a logical flow diagram generally showing one embodiment of a process for managing a user's behavior profile based in part of tracked network activities. As noted above, process 400 of FIG. 4 may be implemented with BT 107 and/or network device 300 of FIG. 3, such that one or more processors within one or more network devices may perform process 400.

Process 400 begins, after a start block, at block 402, where a user identifier may be received. In one embodiment, the user identifier is received from a client device, as a login identifier to a messenger, application, web page, or the like. In another embodiment, the received user identifier is a client device identifier, such as those described above.

Processing then flows to block 404, where various user actions, activities, and the like, are tracked and recorded. In one embodiment, at least some of the activities may be time stamped, such that patterns may be detected. Similarly, at least some of the activities may be summarized to minimize an amount of information tracked for the user. As noted, virtually any network activity performed by a user over a network may be tracked, including, but not limited to where a user 'goes' on the network (which URLs, network devices, or the like, that the user accesses); when the user performs an activity, a type of activity (browsing, sending/receiving messages), blogging, reading, purchasing, downloading items, or the like.

Processing continues to block 406, where at least some information about the user's activities may be received from other sources. For example, where the user posts articles and/or comments to articles on a network device, information about the user's activities might be generated. For example, other users might provide comments to the user's activities that may then be used to generate a reputation for the user. Such reputation information may then be provided, as but one example, of information from other sources. Credit ratings, purchase histories, educational histories, and the like, are but other non-limiting, non-exhaustive examples of information that may be obtained from other sources about the user's networking activities.

Continuing next to block 408 the tracked behavior activities, including the information received from other sources, may be analyzed to detect patterns of the user's networking activities. For example, it might be detected that the user seeks educational information about new vehicles, during a particular time of day, from particular network sources, or the like. Similarly, the user might seek restaurant and/or recipe information at particular times of day, from particular network sources, or the like. In any event, such patterns may also be collected.

Process 400 then flows to block 410, where such activities and patterns may be stored in a user's behavior profile that is indexed based on the user identifier of block 402. Processing then returns to a calling process. However, it should be noted that process 400 could also loop back to block 402 and continue whenever it is detected that a user is on the network. Thus, the user's behavior profile might be continuously revised and updated.

Figure 5:
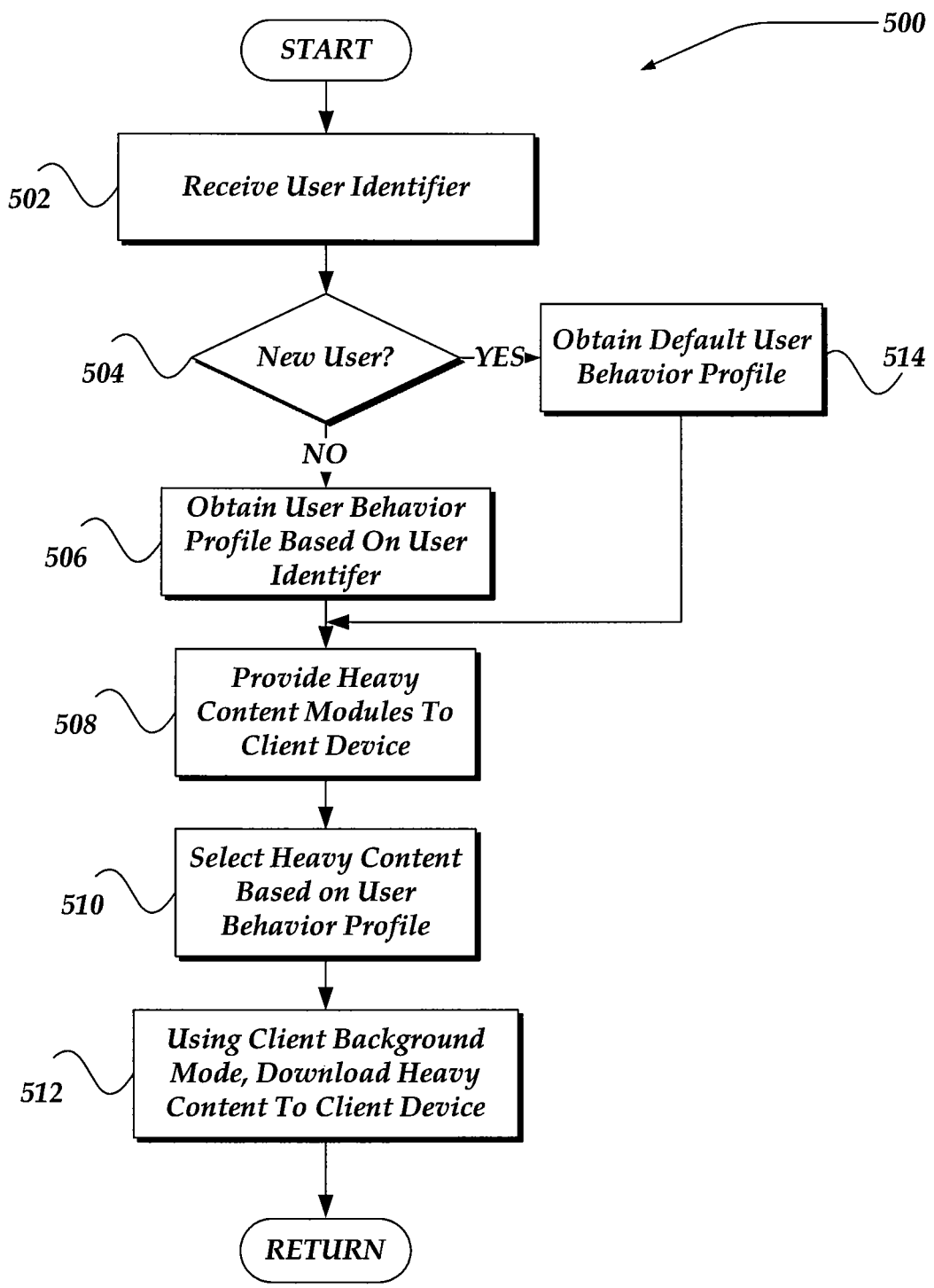
FIG. 5 illustrates a logical flow diagram generally showing one embodiment of a process for managing a background delivery of heavy content to a client device using a background mode of operation of the client device.

FIG. 5 illustrates a logical flow diagram generally showing one embodiment of a process for managing a background delivery of heavy content to a client device using a background mode of operation of the client device. As noted above, process 500 of FIG. 5 may be implemented with HCS 106, CIS 108, and/or client device 200 of FIG. 2, such that one or more processors within one or more network devices may perform process 500.

Process 500 begins, after a start block, at block 502, where a user's identifier is received. In one embodiment, the received user identifier is a same user identifier as described above at block 402 of process 400. In another embodiment, however, the received user identifier might be a new user identifier, for which a user behavior profile has not yet been established.

Thus, continuing to decision block 504, a determination is made whether the user identifier is for a new user for which user behavior profile data has not yet been established. If this is the case, then processing flows to block 514; otherwise, processing flows to block 506.

At block 514, a default user behavior profile might be generated for this new user's identifier. A default user behavior profile might include various information, such as from which application the user identifier might be associated, such as a browser, messenger, a web site, or the like. The default user behavior profile may further include geographical information about where the user identifier's client device might be located, or the like. Such information might be based on information that may be determined based on a network address, such as an IP address, of the user's client device, or the like. Processing then flows to block 508.

At block 506, the user's identifier is used to locate and extract information from a corresponding user's behavior profile. Processing then flows to block 508.

At block 508, the user's behavior profile is analyzed to identify and select one or more heavy content items. Thus, for example, if the user's behavior profile indicates that the user might be interested in a tutorial about a particular, subject, a heavy tutorial might be selected. Similarly, if the user's behavior profile indicates that the user might be interested in purchasing a car, a boat, a house, or some other object, a heavy advertisement, heavy financial article, heavy audio clip, heavy video clip, or the like, might be selected. Clearly, other analysis results might have different heavy content items selected. Thus, the invention is not to be limited based on such illustrative, non-exhaustive examples. In any event, processing flows to block 512, where using a client device's background mode of operation, the selected one or more content items may be downloaded to a client device associated with the user's identifier. Processing then returns to a calling process to perform other actions.

Figure 6:
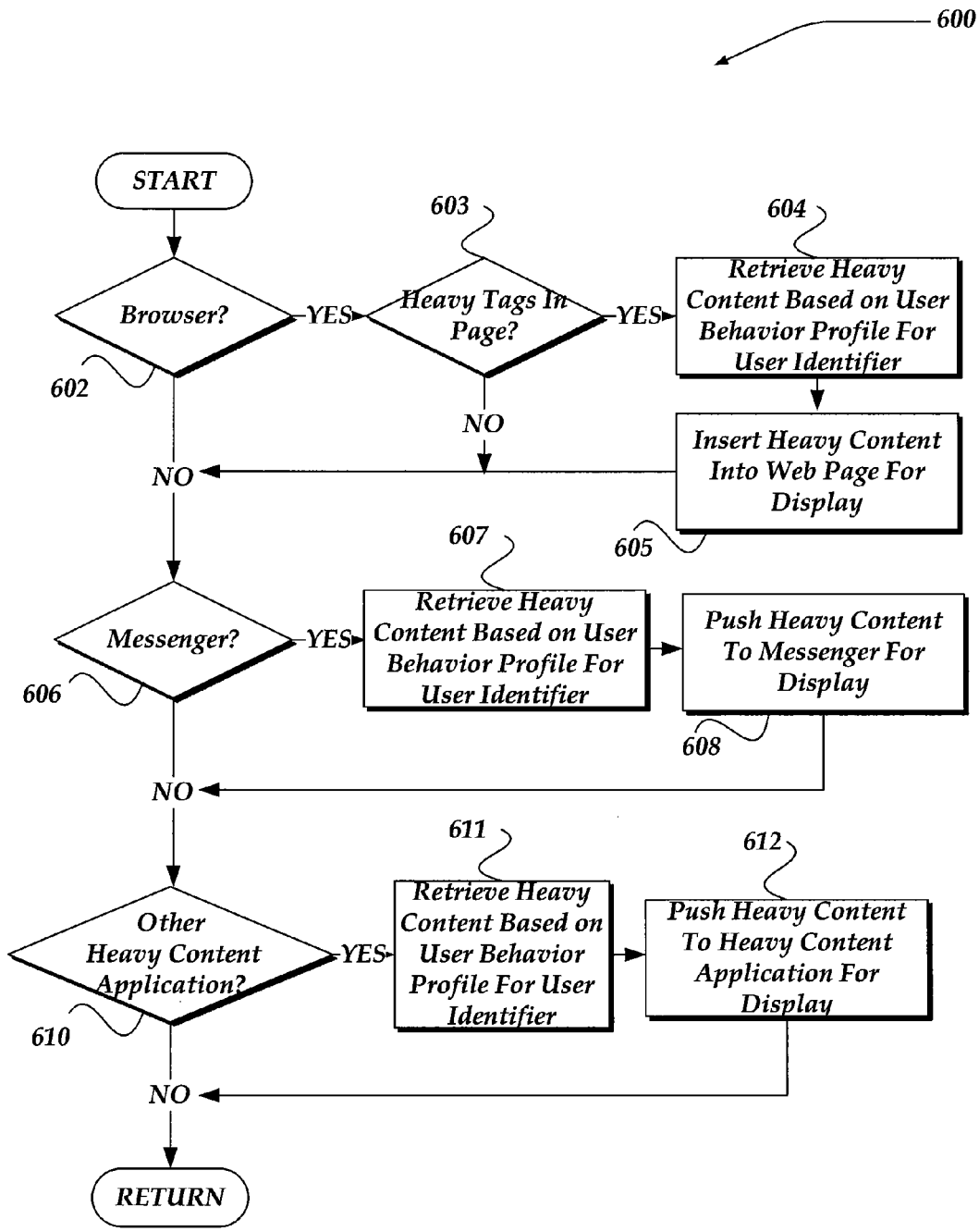
FIG. 6 illustrates a logical flow diagram generally showing one embodiment of a process for managing access to heavy content to a user of a client device for various client applications.

FIG. 6 illustrates a logical flow diagram generally showing one embodiment of a process for managing access to heavy content to a user of a client device for various client applications. As noted above, process 600 of FIG. 6 may be implemented with client device 200 of FIG. 2, such that one or more processors may perform process 600.

Process 600 begins, after a start block, at decision block 602, where a determination is made where a client application presently executing is a browser. If so, processing flows to decision block 603; otherwise, processing flows to decision block 606.

At decision block 603, a determination is made whether a received web page within the browser includes a heavy tag, link, or other mechanism for use in indicating that the received web page an available location for displaying, or otherwise delivering for access by a user, a heavy content item. If it is determined that the web page is so configured, processing flows to block 604; otherwise, processing flows to decision block 606.

At block 604, one or more heavy content items is selected and retrieved from a local client store based on the user behavior profile and/or user identifier associated with the current user. Processing flows then to block 605, where the selected heavy content item(s) are inserted into the web page for access by the user. In one embodiment, the insertion of the heavy content item might result in replacing of another content item within the web page. In another embodiment, the web page might be configured such that no other content item is replaced by the heavy content item. Processing then flows to decision block 606.

At decision block 606, a determination is made whether a client application is a messenger application for which the user is currently using, such that heavy content items might be made available to the user. If so, then processing flows to block 607; otherwise processing flows to decision block 610. With changes in technology, it becomes readily apparent that a user might have several client applications resident on their display screen for their client device at a single time. In one instances, however, only one of these client applications might be considered active or current for the user. However, in other embodiments, several client applications might be considered current or active on the client device. Thus, in one embodiment, several client applications might be evaluated and enabled to display a heavy content item. In one embodiment, the multiple client applications might display a same heavy content item. However, in another embodiment, different heavy content items might be displayed within different client applications, based further on a subject of the client application. For example, a web page might be currently displayed, or being accessed by the user's browser that is associated with movies, while the user's messenger might be include message communications with another user about food, restaurants, or the like. Thus, different heavy content items may also be selected based on a currently user behavior and/or context associated with the client application. Therefore, at block 607, a same or different heavy content item might be selected and retrieved for the messenger application, based on a context associated with the messenger application, as well as the user's behavior profile and user identifier. Processing then flows to block 608, where the selected heavy content item is pushed, or otherwise made available to the messenger application for insertion into a message, display on a skin, toolbar, or other location within the messenger application, or the like. Processing then flows to decision block 610.

At decision block 610, a determination is made whether another application is configured to display heavy content items and is currently active to the user. For example, a game application, spreadsheet application, word processing application, security application, or the like, might be configured to receive and display heavy content items. For example, advertisements, tutorials, or the like, might be displayed within a game, or other application. Thus, if the other application is so configured, processing flows to block 611; otherwise, processing returns to a calling process to perform other actions.

At block 611, a same or different heavy content item might be selected and retrieved for the other heavy content application, based on a context associated with the other heavy content application, as well as the user's behavior profile and user identifier.

Processing then flows to block 612, where the selected heavy content item is pushed, or otherwise made available to the other heavy content application for insertion into a application window, display on a skin, toolbar, or other location within the messenger application, or the like. Processing then returns to a calling process to perform other actions.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems that perform the specified actions or steps, The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method comprising:
    automatically transmitting, via a processor, for download to a client device, a module for installation on the client device for use in managing heavy content delivery within the client device;
    receiving, via the processor, an identifier associated with the client device;
    using, via the processor, the identifier to locate a user behavior profile that includes tracked behaviors of a user over the network, the user behavior profile comprising a social network reputation for the user;
    using, via the processor, the located user behavior profile to determine a heavy content item, the heavy content item comprising digital content that is greater than a size constraint;
    automatically transmitting, via the processor to the client device for download, the determined heavy content item, such that the transmitting of the heavy content item comprises instructions for the client device to perform the download in a background mode, where the instructions to download in the background mode comprises instructions to wait until a resource is available from a foreground application so that there is limited impact on execution of the foreground application by the background downloading, and when an application within the client device is executed, the downloaded modules within the client device intercept a request from the application and based on the request serves for display within the application the heavy content item, the application having a heavy tag indicating an available location for displaying the downloaded heavy content item,
    wherein the transmitting for download the heavy content item further comprises providing instructions to replace a default non-heavy content item within the application with the heavy content item at the location indicated by the heavy tag.

2. The method of claim 1, wherein the heavy content is a heavy advertisement.

3. The method of claim 1, wherein the user behavior profile includes at least one of a geographical location of the user, a messaging history of activities by the user, a browsing history of the user, or a hot word list indicating at least a number of hits of a particular word or phrase in a history of communications by the user.

4. The method of claim 1, wherein the application within the client device is at least one of an instant messaging application or a web browser.

5. The method of claim 1, wherein the downloaded module is a browser agent that includes at least one of an activeX component, a plug-in, or a browser extension.

6. The method of claim 1, wherein the transmitting for download the heavy content item in a background mode further comprises transmitting for download based on a limited foreground application impact including use of memory.

7. A computing device comprising:
a processor;
a storage medium for tangibly storing thereon program logic for execution by the processor, the program logic comprising:
communicating logic executed by the processor for communicating, over a network to a server, an identifier that the server uses to locate and access a user behavior profile that includes tracked network history data for a user associated with the identifier, the user behavior profile comprising a social network reputation for the user;
selecting logic executed by the processor for remotely selecting, based on the located user behavior profile, a heavy content item, the heavy content item comprising digital content that is greater than a size constraint;
downloading logic executed by the processor for automatically downloading the selected heavy content item in a background mode of operation within the computing device onto the computing device, where downloading in the background mode waits until a resource is available from a foreground application so that there is limited impact on execution of the foreground application by the background downloading, wherein the heavy content item is downloaded without an additional user interaction and absent a display of a web page on the computing device having a link associated with a heavy content item;
intercepting logic executed by the processor for intercepting a request for a web page having a heavy tag indicating an available location for displaying the heavy content item; and
second selecting logic executed by the processor for selecting within the web page one of the automatically downloaded at least one heavy content item based on a detection of the heavy tag,
wherein the displaying the downloaded heavy content item further comprises replacing a default non-heavy content item within the web page with the heavy content item at the location indicated by the heavy tag.

8. The computing device of claim 7, wherein selecting one of the automatically downloaded heavy content items further comprises determining that the identifier provided over the network is a current identifier of a user currently using the computing device.

9. The computing device of claim 7, wherein the identifier is a messenger login identifier or a computing device Internet Protocol address.

10. The computing device of claim 7, wherein the program logic further comprises:
detecting logic executed by the processor for detecting that a messenger application is
executing on the computing device;
second selecting logic executed by the processor for selecting, based on the detection,
another downloaded heavy content item; and
second communicating logic executed by the processor for communicating the selected other downloaded heavy content item to the messenger application, wherein the messenger application displays the provided heavy content item within the messenger application.

11. The computing device of claim 7, wherein displaying the downloaded heavy content item further comprises displaying a first heavy content item within the web page for a first time period, and then automatically replacing the first heavy content item with a second heavy content item for display for a second time period, wherein the web page remains within a web browser throughout the display of the first and the second heavy content item.

12. The computing device of claim 7, wherein the program logic further comprises:
detecting logic executed by the processor for detecting that an application toolbar is
displayed on the computing device;
second selecting logic executed by the processor for selecting, based on the detection,
another downloaded heavy content item; and
second displaying logic executed by the processor for displaying the selected other downloaded heavy content item within the application toolbar on the computing device.

13. A system comprising:
a processor;
a memory configured to store computer instructions executed by the processor,
the computer instructions comprising:
tracking, by the processor, network activities by a user;
storing, by the processor, the tracked network activities as a user behavior profile for the user based on an identifier associated with the user, the user behavior profiles comprising a social network reputation for the user;
transmitting, by the processor, for automatic download on a client device, a heavy content item, such that the transmitting of the heavy content item comprises instructions for the client device to perform the download in a background mode of operation, wherein the instructions to download in the background mode comprises instructions to wait until a resource is available from a foreground application so that there is limited impact on execution of the foreground application by the background downloading, wherein the heavy content item is downloaded without an additional user interaction including requesting the heavy content item and absent a web page link being analyzed for the heavy content item, the heavy content item comprising digital content that is greater than a size constraint; and
providing instructions, by the processor, to select the automatically downloaded heavy content item within a client application, the client application having a heavy tag indicating an available location for displaying the downloaded heavy content item, wherein the transmitting for download the heavy content item further comprises providing instructions to replace a default non-heavy content item within the application with the heavy content item at the location indicated by the heavy tag.

14. The system of claim 13, wherein the client application includes at least one of a web browser, a messenger, or a toolbar.

15. The system of claim 13, wherein the providing instructions to select the automatically downloaded heavy content item within the client application further comprises:

the client application is a web browser, and wherein a web page is requested by a user associated with the identifier, the web page having the tag within the web page indicating that the web page is configured to include the heavy content item;

detecting the tag; and based on the detection, placing the heavy content item within the web page.

16. The system of claim 13, wherein the selected heavy content item is displayed in a web page and further within a messenger application without downloading the heavy content item a second time.

17. The system of claim 13, wherein the heavy content item is at least one of an advertisement, a movie, a game application, or a tutorial.

18. The system of claim 13, wherein the providing instructions to select the heavy content item within the client application further comprises:

the client application being a web browser, and initially providing instructions to display a web page within the web browser, the web page displaying a default advertisement, the web page further including the tag useable to indicate that the web page is configured to include a heavy advertisement;

detecting the tag within the web page; and replacing the default advertisement with the selected heavy content item that is a heavy advertisement for display within the web page instead of the replaced default advertisement.

19. The system of claim 13, wherein the providing instructions to select the heavy content item within the client application further comprises:

transmitting for display a first heavy content item within the web page for a first time period, and then providing instructions to automatically replace the first heavy content item with a second heavy content item for display for a second time period, wherein the web page remains within a web browser throughout the display of the first and the second heavy content item.

* * * * *